United States Patent [19]

Segar et al.

[11] 4,447,680
[45] May 8, 1984

[54] POWER COLLECTION APPARATUS FOR A TRANSPORTATION SYSTEM

[75] Inventors: William R. Segar; Robert A. Larson, both of Monroeville, Pa.

[73] Assignee: Westinghouse Electric Corp., Pittsburgh, Pa.

[21] Appl. No.: 962,550

[22] Filed: Nov. 20, 1978

Related U.S. Application Data

[63] Continuation of Ser. No. 684,058, May 6, 1976.

[51] Int. Cl.³ ............................................. B60L 5/40
[52] U.S. Cl. ..................................... 191/48; 104/130; 104/246; 191/45 R
[58] Field of Search ................. 191/45 R, 48, 49, 57, 191/59.1, 22 R, 29 R, 32; 104/130, 246; 246/415 R, 419

[56] References Cited

U.S. PATENT DOCUMENTS

| | | | |
|---|---|---|---|
| 2,815,185 | 12/1957 | Hirtenstein | 246/419 |
| 3,672,308 | 6/1972 | Segar | 104/246 |
| 3,733,446 | 5/1973 | Colovas | 191/59.1 |
| 3,767,868 | 10/1973 | Storrer | 191/49 |
| 4,090,452 | 5/1978 | Segar | 104/130 |

OTHER PUBLICATIONS

Catalogue Copyrighted in 1970 by Howell Corp., "Swivel Yoke Collectors", Alleyne C. Howell.

Primary Examiner—Reinhard J. Eisenzopf
Attorney, Agent, or Firm—R. G. Brodahl

[57] ABSTRACT

A power collection apparatus is disclosed for the purpose of power distribution from a central power supply to the propulsion motors of at least one mass transit vehicle operative with a predetermined roadway track, including one or more rail gaps and/or crossover switches, to permit the vehicle to transfer from one section to a second section of that roadway track. The power collection apparatus includes collector support apparatus carried by each vehicle and designed to be operative with a rail support member for three individual phase power rails, a ground rail and a signal rail, permitting high speed vehicle passage through a rail gap and a crossover switch.

10 Claims, 7 Drawing Figures

POWER COLLECTION APPARATUS FOR A TRANSPORTATION SYSTEM

This is a continuation of application Ser. No. 684,058, filed May 6, 1976.

CROSS-REFERENCE TO RELATED APPLICATIONS

Reference is made to a U.S. patent application Ser. No. 639,955, filed Dec. 11, 1975, and now U.S. Pat. No. 4,090,452, by W. R. Segar and entitled Power Rail, Control Signal Rail And Guide Beam Arrangement for A Transportation System, which application discloses a prior art power collection apparatus and is assigned to the same assignee as the present invention. The disclosure of the latter patent application is incorporated herein by reference.

In addition, reference is made to U.S. patent application Ser. No. 684,057, and now U.S. Pat. No. 4,043,436, of W. R. Segar and R. A. Larson filed concurrently herewith and entitled Power Rail Support Apparatus For A Transportation System, which application discloses a power rail support apparatus operative with the present power collection apparatus and is assigned to the same assignee as the present invention.

BACKGROUND OF THE INVENTION

The provision of a power collection apparatus including a power ground and control signal rail arrangement is known in the prior art for application in a transportation system to supply power, grounding and control signals to at least one transportation vehicle which is directed along the transportation system roadways by guide wheels depending from the vehicle and which follow a guide beam incorporated as part of the roadway. The arrangement provides for mounting at least the power rails on top of the roadway guide beam to establish power collection surfaces which are resistant to dirt and moisture and the operation of which is not substantially disturbed due to the normal relative movements between the guide beam and the vehicle. The power rails are disposed in a triangular arrangement providing connection to the three phases of a three phase alternating power signal and positioned on the top of the guide beam. A pivotal guide beam switch can be provided for directing a vehicle between a first and second roadway or alternatively between a first and third roadway if desired. A power and control signal rail arrangement cooperative with suitable vehicle connectors provides ground rail and control signal rail connections to the vehicle as it passes through the pivotal guide beam switch.

Transportation systems employing at least one self-propelled rubber tired vehicle which traverses a roadway comprised of spaced parallel tracks are well known in the prior art and generally described in the Transit Expressway Report of the MPC Corporation, 4400 Fifth Avenue, Pittsburgh, Pa. 15213, dated Feb. 20, 1967, and in U.S. Pat. No. 3,312,180 of E. O. Mueller. In these prior art transportation systems the vehicles are directed along the roadway by guide wheels depending from the bottom of each vehicle and traveling a guide beam supported between and parallel to the roadway tracks. Also in these transportation systems electric power is supplied to the vehicle through current collectors in contact with power rails mounted in relation to the guide beam or to the roadway tracks. Control signals are supplied to the vehicle through antennas mounted on the roadway.

In a power rail mounting arrangement known in the prior art, as disclosed in published articles appearing in the Westinghouse Engineer for July 1965 at pages 98 to 103 and in the Westinghouse Engineer for Janurary 1969 at pages 9 to 15, power rails were mounted in insulated brackets fixed to the roadway tracks. This arrangement for mounting power rails required extensive adjustment at the installation site to obtain proper alignment between the rails and the collectors mounted on the vehicle making this arrangement expensive and difficult to implement. In addition, since this arrangement could not provide power to a vehicle traveling through roadway switch areas, it required additional sets of power rails and complementary collectors at the roadway switch areas. A second power rail arrangement, known in the prior art and disclosed in U.S. Pat. No. 3,672,308 of W. R. Segar, provided for bracketing the power rails to a lower flange of the guide beam such that the rail surfaces in contact with the collectors were located below the horizontal plane of the vehicle guide wheels. Since this arrangement would allow the guide wheels to pass over the power rails, power could be provided to the vehicle as it traveled through the roadway switching areas. However, since the power rails were also located close to the road bed, they were susceptible to accumulations of dirt and moisture on the collection surfaces of the rails. These prior art arrangements permitted lateral or rolling forces acting on the vehicle to interfere with the contact between the collectors and the power rails, and for transportation systems with vehicle turnaround capability required multiple sets of power rails, power collectors and control signal rails. Also, since the power rails of the prior art arrangements were laterally disposed, reactive interference between power rails carrying a multiple phase alternating power signal limited the efficiency of the rail arrangements of the prior art.

SUMMARY OF THE INVENTION

The present invention relates to an improved power collection apparatus including a power, ground and control signal rail support member and the collector support apparatus operative therewith for providing power, grounding and control signals to at least one vehicle in a transportation system. The power, ground and control signal rails are supported in relation to the roadway guide beam to provide a simple and more economical installation by mounting the rails in rail mounting members operative with a rail support member fastened to the guide beam which directs the vehicle along the roadway. Mounting the power, ground and control signal rails in relation to the upper flange of the roadway guide beam such that the collection surfaces are in a predetermined position arrangement in a vertical plane, also makes the power, ground and control signals resistant to interference caused by accumulations of moisture and dirt on the collector surfaces of the rails. The power collector shoes of the present power collector support apparatus are guided in accordance with the respective positions of the ground collector shoe and the control signal collector shoe and are movable in relation to the vehicle and the guide beam to minimize interference from lateral and rolling forces acting on the vehicle and movements of the vehicle in relation to the guide beam and the roadway. The power rails are disposed in a triangular configuration which reduces the reactive interference between phases of a multiple phase alternating power signal. The central position of the rail support member and the associated power rail configuration in relation to the roadway guide beam facilitates vehicle turnaround capability. The power collector shoes carried by the collector support apparatus fastened to the vehicle are guided in position and in relation to the power rails by cooperating collector shoes operative with the respective ground rail and signal rail to permit high speed vehicle passage through switch areas.

PREFERRED EMBODIMENT OF THE INVENTION

Figure 1:
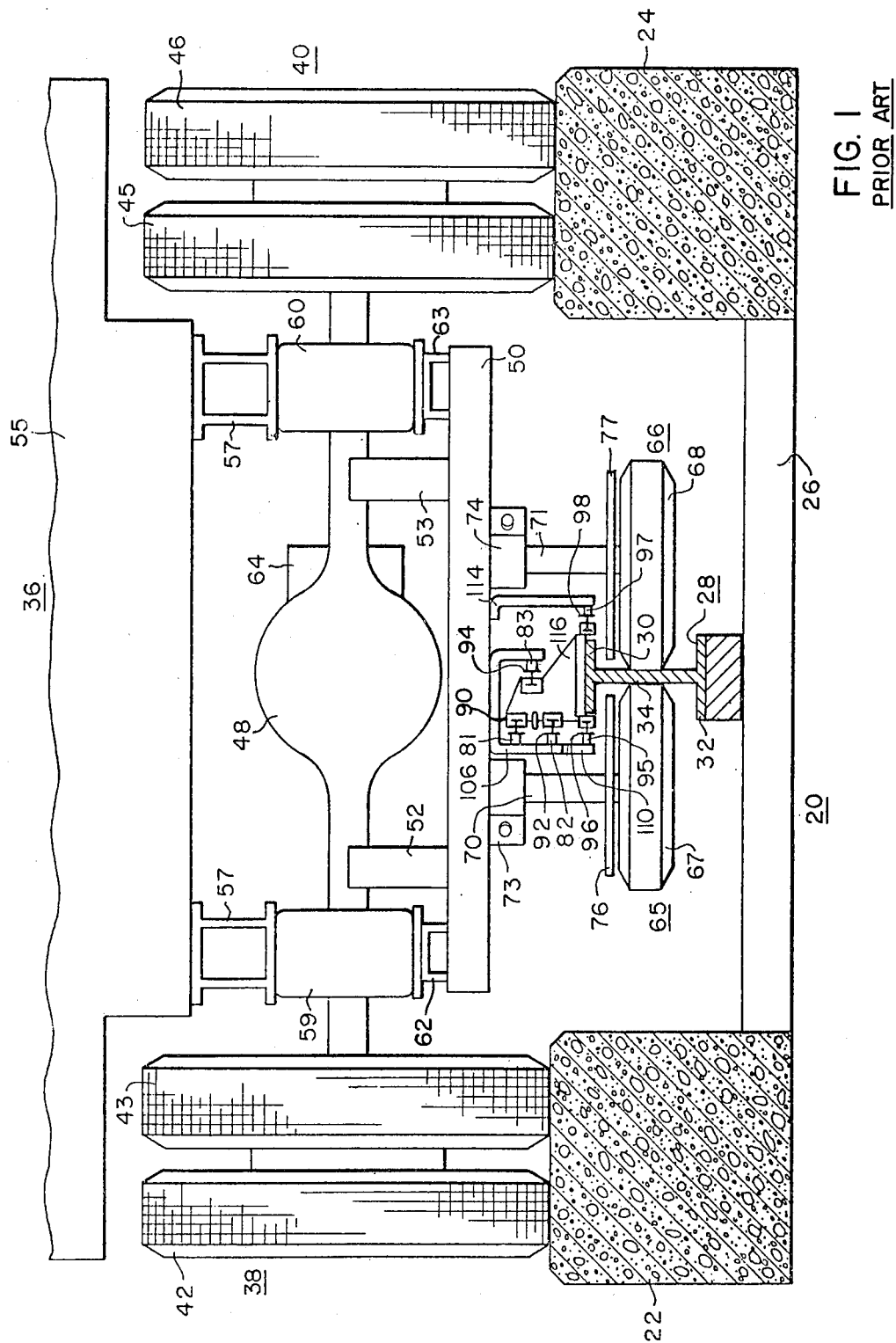
FIG. 1 is a cross-sectional view of a transportation system roadway taken in a plane perpendicular to the longitudinal axis of the roadway and showing a prior art power collection apparatus.

FIG. 1 is a cross-sectional view of a prior art transportation system power collection apparatus taken along the longitudinal axis of the roadway. The roadway 20 is comprised of laterally spaced concrete tracks 22 and 24 supported from a road bed 26 and including a flanged guide beam 28 located between tracks 22 and 24. The guide beam 28 has an upper flange 30 and lower flange 32 joined by a vertical web 34. A transportation vehicle 36 has a pair of resilient and laterally spaced vehicle main wheels 38 and 40 running on the tracks 22 and 24 respectively. Wheel 38 is comprised of tires 42 and 43 and the wheel 40 is comprised of tires 45 and 46. The vehicle 36 is provided with at least two such pairs of resilient and laterally spaced wheels fixed longitudinally along the vehicle. The wheel pair 38 and 40 is connected by an axle contained in an axle housing 48 which is fixed to the vehicle frame 50 by support brackets 52 and 53. The vehicle 36 is further provided with a body 55 mounted on a longitudinal frame 57 resiliently supported by air springs 59 and 60 mounted on channel members 62 and 63 on the vehicle frame 50. The vehicle is powered by an electric propulsion motor 64 coupled to the axle connecting the wheels 38 and 40.

The vehicle steering mechanism includes opposing guide wheels 65 and 66 which follow the opposite sides of the guide beam web 34. One such set of guide wheels 65 and 66 is shown in FIG. 1 and comprises pneumatic resilient tires 67 and 68 carried on vertical axles 70 and 71 which are clamped to the frame 50 by support bushings 73 and 74. The ends of the vertical axles 70 and 71 are clamped in a position which produces a predetermined force between the guide beam web 34 and the pneumatic tires 67 and 68. Due to the resiliency of the pneumatic tires 67 and 68, the normal operating distance between the surface of guide beam web 34 and the center line of the vertical axles 70 and 71 is somewhat less than the radius of the pneumatic wheels 67 and 68. This distance will be referred to as the operating radius. Excessive deviations in the operating radius due to unusual lateral forces acting on the transportation vehicle 36 or due to underinflation of pneumatic tires 67 or 68 are limited by steel safety discs 76 and 77 attached to the vertical axles 70 and 71 respectively. The radius of each safety disc is slightly less than the operating radius of its associated pneumatic tire so that if a pneumatic tire 67 or 68 becomes deflated or the car experiences abnormally strong lateral wind, centrifugal or steering forces, the associated safety disc 76 or 77 will engage the web 34 of the guide beam 28 and assume steering control of the vehicle. The safety discs 76 and 77 serve a second function by cooperating with the upper flange 30 of guide beam 28 to oppose forces tending to cause the vehicle to roll off the roadway.

For supplying electric power and control signals to the vehicle, power collector shoes 81, 82 and 83 are provided in contact with power rails 90, 92 and 94, respectively. In addition, ground collector shoe 95 is in contact with ground rail 96 and control signal collector shoe 97 is in contact with control signal rail 98. Collector shoes 81, 82 and 83 are carried by support bracket 106 affixed to the vehicle frame 50. The ground rail collector 95 is mounted in bracket 110 and signal rail collector 97 is mounted in bracket 114 which are similarly fixed to the vehicle frame 50. Power rails 90, 92 and 94, ground rail 96 and the signal rail 98 are insulatively supported by mounting bracket 116 attached at predetermined longitudinal intervals in the order of every five feet to the upper flange 30 of the guide beam 28. The arrangement shown in FIG. 1 for insulatively mounting power rails 90, 92, 94, ground rail 96 and signal rail 98 from bracket 116 fixed to the upper flange of guide beam 28 provides an improved power rail, ground rail and signal rail mounting arrangement. Because the guide beam 28 is positioned within closer tolerance than are the roadway surfaces and because the vehicle 36 is actually steered by the guide beam and not the roadway surfaces, the arrangement of mounting the power rails 90, 92, 94 and the ground rail 96 and signal rail 98 to the guide beam 28 provides a more accurate and convenient alignment between the respective rails and the collector shoes 81, 82, 83, 95 and 98.

Since each bracket 116 projects above the upper flange 30 of the guide beam 28, the power rails 90, 92 and 94 are disposed above the road bed 26 to make the power control circuits less susceptible to interference caused by accumulation of dirt or moisture on the power, ground and signal rail. Additionally, the collection surfaces of the rails are in a vertical plane which also serves to decrease power circuit and control circuit susceptibility to the accumulation of dirt and moisture on the rail collection surfaces.

Figure 2:
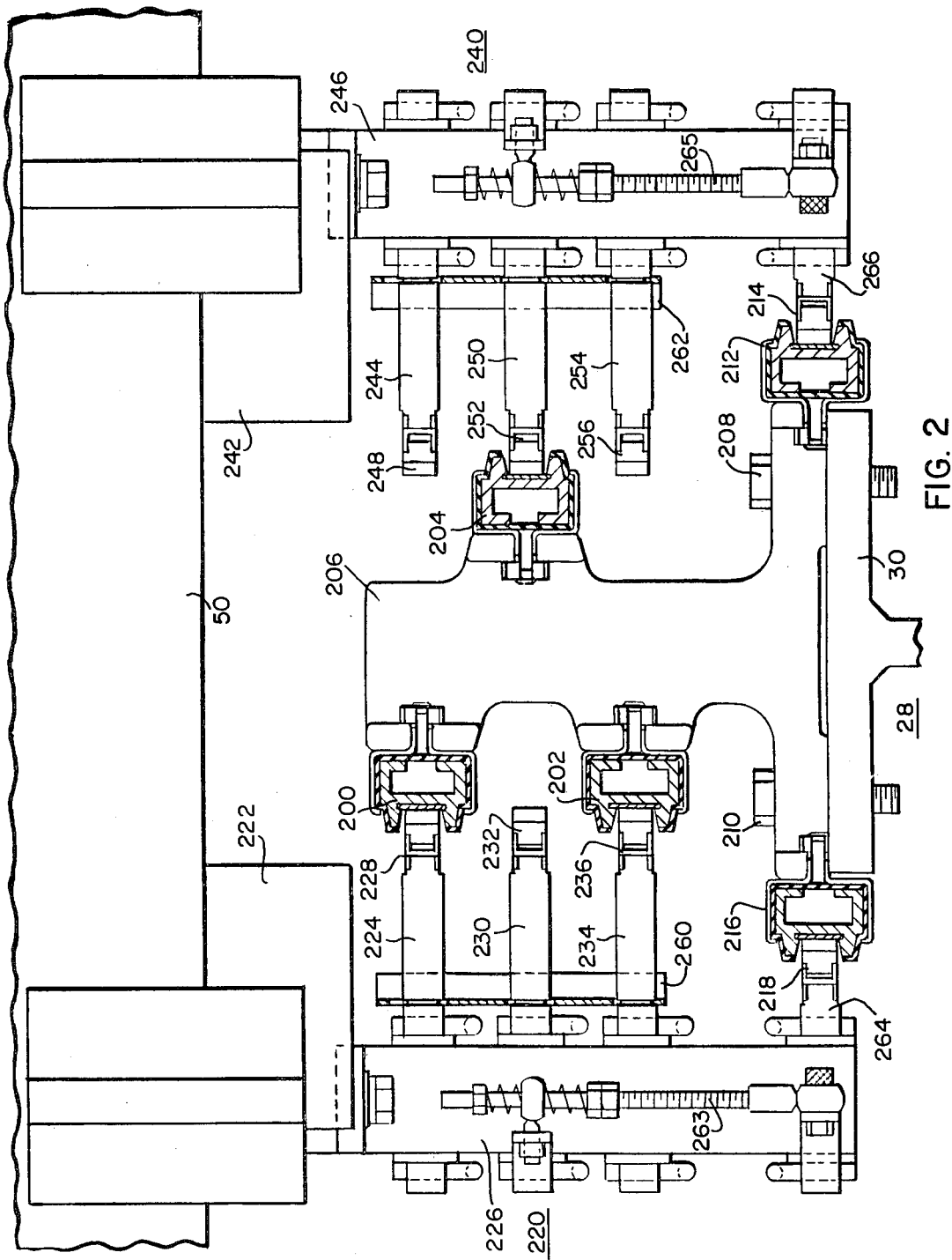
FIG. 2 is an end view of the present power collection apparatus, including the power, ground and signal rail arrangement and the power collector shoes operative therewith.

FIG. 2 illustrates an end view of the present power and signal rail arrangement for supplying power to the propulsion motor of a vehicle through the power rails 200, 202 and 204. The power rails are supported by rail support member 206 connected by bolts 208 and 210 to the upper horizontal flange 30 of the guide beam 28. Control signals are provided to the vehicle through the signal rail 212 and the cooperative collector shoe 214 in communication with the control equipment aboard the vehicle. The ground rail 216 is operative with collector shoe 218.

The power collection apparatus carried by the vehicle, when the vehicle is moving forward into the plane of the drawing, includes a first collector support apparatus 220 mounted on a bushing 222 fastened to the left side of the vehicle frame 50. A first power collector arm 224 is pivotally fastened to the collector support member 226 and carries the collector shoe 228 operative with the power rail 200. A second power collector arm 230 is pivotally fastened to the collector support member 226 and carries the collector shoe 232 which is not operative with a power rail. A third power collector arm 234 is pivotally fastened to the collector support member 226 and carries the collector shoe 236 operative with power rail 202. The power collection apparatus carried by the vehicle, as shown in FIG. 2, includes a second collector support apparatus 240 mounted on a bushing 242 fastened to the right side of the vehicle frame 50. A fourth power collector arm 244 is pivotally fastened to the collector support member 246 and carries the collector shoe 248 which is not operative with a power rail when the vehicle is moving forward into the plane of the drawing. A fifth power collector arm 250 is pivotally fastened to the collector support member 246 and carries the collector shoe 252 operative with the power rail 204. A sixth power collector arm 254 is pivotally fastened to the collector support member 246 and carries the collector shoe 256 which is not operative with a power rail at this time. The power rails 200, 202 and 204 are positioned in a triangular arrangement as shown by the rail support member 206. The collector arms 224, 230 and 234 are connected together in a first group by a fastener member 260. The collector arms 244, 250 and 254 are connected together into a second group by a fastener member 262. The first group of collector arms 224, 230 and 234 is operative though connection member 263 to be movable in position substantially parallel to the axis of collector support member 226 to follow the movement of the collector arm 264 and collector shoe 218 as determined by the position of the ground rail 216. The second group of collector arms 244, 250 and 254 is operative through connection 265 to be movable in position substantially parallel to the axis of collector support member 246 to follow the movement of collector arm 266 and collector shoe 214 as determined by the position of the control signal rail 212.

The power rails 200, 202 and 204, signal rail 212, ground rail 216 and guide beam 28 are arranged as shown in FIG. 2 to maintain improved contact between the respective vehicle carried collector shoes 228, 236, 252, 214 and 218 and the rail collection surfaces as the vehicle experiences rolling and lateral forces which, for example, may be exerted by wind or centrifugal force against the vehicle, which rolling forces experienced by the vehicle cause the vehicle frame 50 to move in relation to a longitudinal axis of rotation, and since the guide wheels act to center the vehicle frame 50 over the web of the guide beam 28. The longitudinal axis of rotation of the vehicle frame 50 is in a vertical plane including the web.

Collection surfaces of rails 200, 202 and 204 are in a vertical plane and the collector shoes 228, 236 and 252 are retractably mounted to the respective collector support members 226 and 246 by springs or in some other well-known manner to compensate for slight variations in the position of the respective collector support members 226 and 246 with respect to the rails 200, 202 and 204. One cause of these variations may be due to lateral forces acting against the vehicle.

As is well known in the field of power transmission among the arrangements of closely grouped three phase conductors, the least reactive interference between phases is offered by the triangularly disposed power rails, with power rails 200, 202 and 204 being arranged in such a low reactance arrangement.

Figure 3:
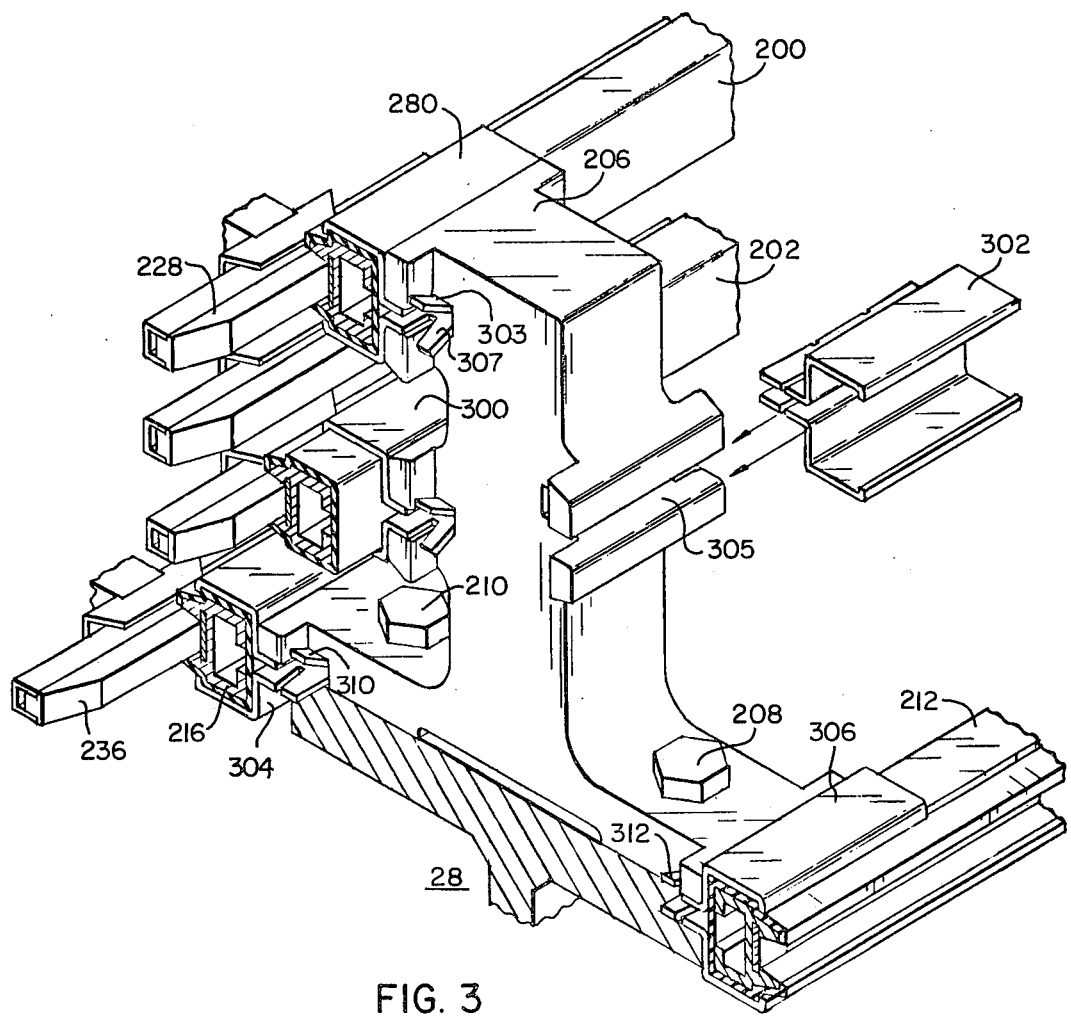
FIG. 3 is an isometric view of the present power, ground and signal rail arrangement and the power collector shoes operative therewith.

FIG. 3 shows an isometric view of the present power and signal rail arrangement, including the rail support member 206, power rails 200, 202 and 204, the collector shoes 228, 236 and 252. Each power rail, such as power rail 200 is clamped to the rail support member 206 through a rail mounting member, such as rail mounting member 300 having wedge lugs 303 and 307 which can be separated as shown in FIG. 3 for holding the power rail 200 securely in position relative to the rail support member 206. The rail mounting member and rail support member are described in greater detail in the cross referenced and related patent application by W. R. Segar and R. A. Larson.

Figure 4:
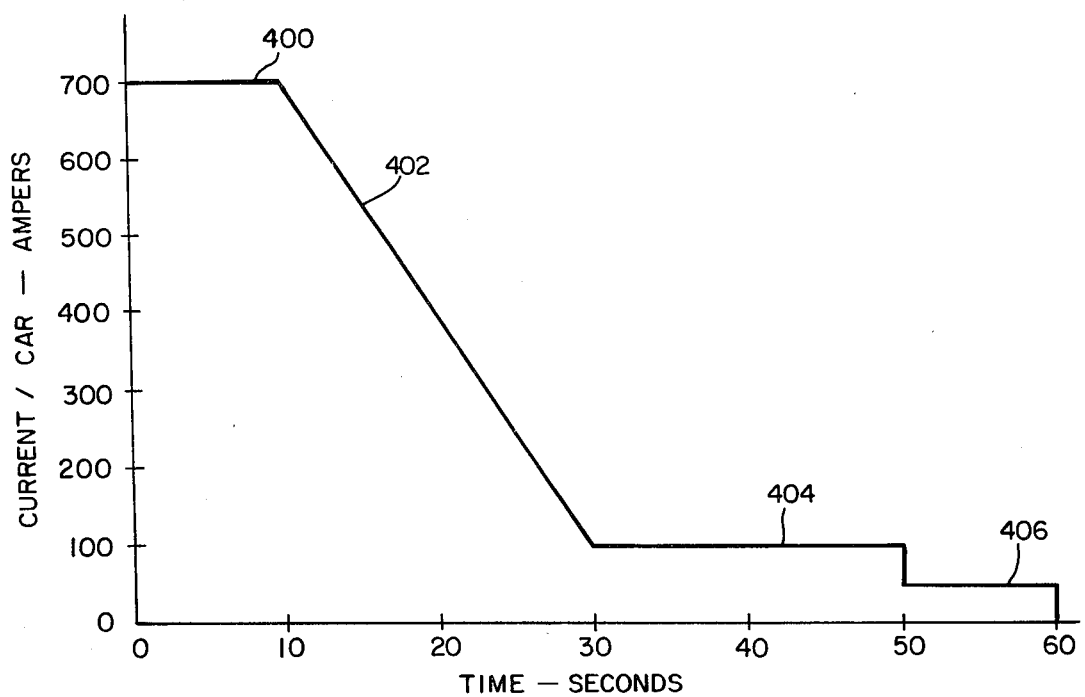
FIG. 4 is a graph of motor current versus time to illustrate the propulsion motor current supplied to a vehicle by the power rails.

The graph of FIG. 4 shows the typical vehicle car propulsion motor current versus time requirements profile. The first portion 400 shows the initial acceleration current from zero speed. The second portion 402 shows the motor curve acceleration current until operating speed is reached at the operating speed maintaining current third portion 404. Finally, the car is stopped and the propulsion motors are no longer energized, where only the auxiliary device current requirement is shown in the fourth portion 406.

The signal rail 212 and ground rail 216 shown in FIG. 2 are continuous throughout the entire roadway including through the vehicle track switch areas. The vehicle tires ride above the signal rail 212 and ground rail 216 positions when a vehicle moves through a switch, and the power rails 200, 202 and 204 are discontinued to permit the tires to pass through the switch. The vehicle support roadway surface is above the signal rail 212 and ground rail 216 positions and below the positions of the power rails 200, 202 and 204. The respective collector shoes 214 and 218 operative with the signal rail 212 and the ground rail 216 function to continuously guide and thereby control the positions of the respective collector shoes 252, 228 and 236 operative with the power rails 204, 200 and 202. Each power rail, when discontinued for a switch, includes a well known guide horn (not shown) to provide a vernier positioning of the collector shoe operative therewith when the vehicle has completed its passage through the switch and the associated power collector shoes again engages that power rail. The positional parallelism of all four collector shoes carried by the vehicle on each side of the center guide beam is assured by the present power collection apparatus. For high speed passage of the vehicle through a switch at a speed in the order of 60 miles per hour, it is desired that the proper alignment position of each collector shoe with its respective cooperative power rail be accurately guided and controlled. The collector support apparatus, for example the second collector support apparatus 240, includes the power collector arm 250 and the power collector arm 266 extending to the opposite side of the collector support member 246 and being connected together by an adjustable connection member 265. The latter connection member 265 is adjustable in length to establish the desired distance between the guide power collector arm 266 and the controlled second group of collector arms 244, 250 and 254. When the collector shoe 214 is moved in position by the cooperative signal rail 212, this correspondingly moves the second group of collector shoes 248, 252 and 256, with the relative spacing positions of the power rails, the ground rail and the signal rail being fixed by the shape of the rail support member 206. The proper alignment is assured of the power rails and the respective collector shoes when the veicle passes through a switch and the respective collector shoes again come into contact with the associated power rails. Vehicle turnaround operation in both directions along a given roadway track is permitted by the symmetrical sets of power collector support apparatus 220 and 240 on either side of the guide beam 28 to permit the vehicle to move in both directions along the same track.

Figure 5:
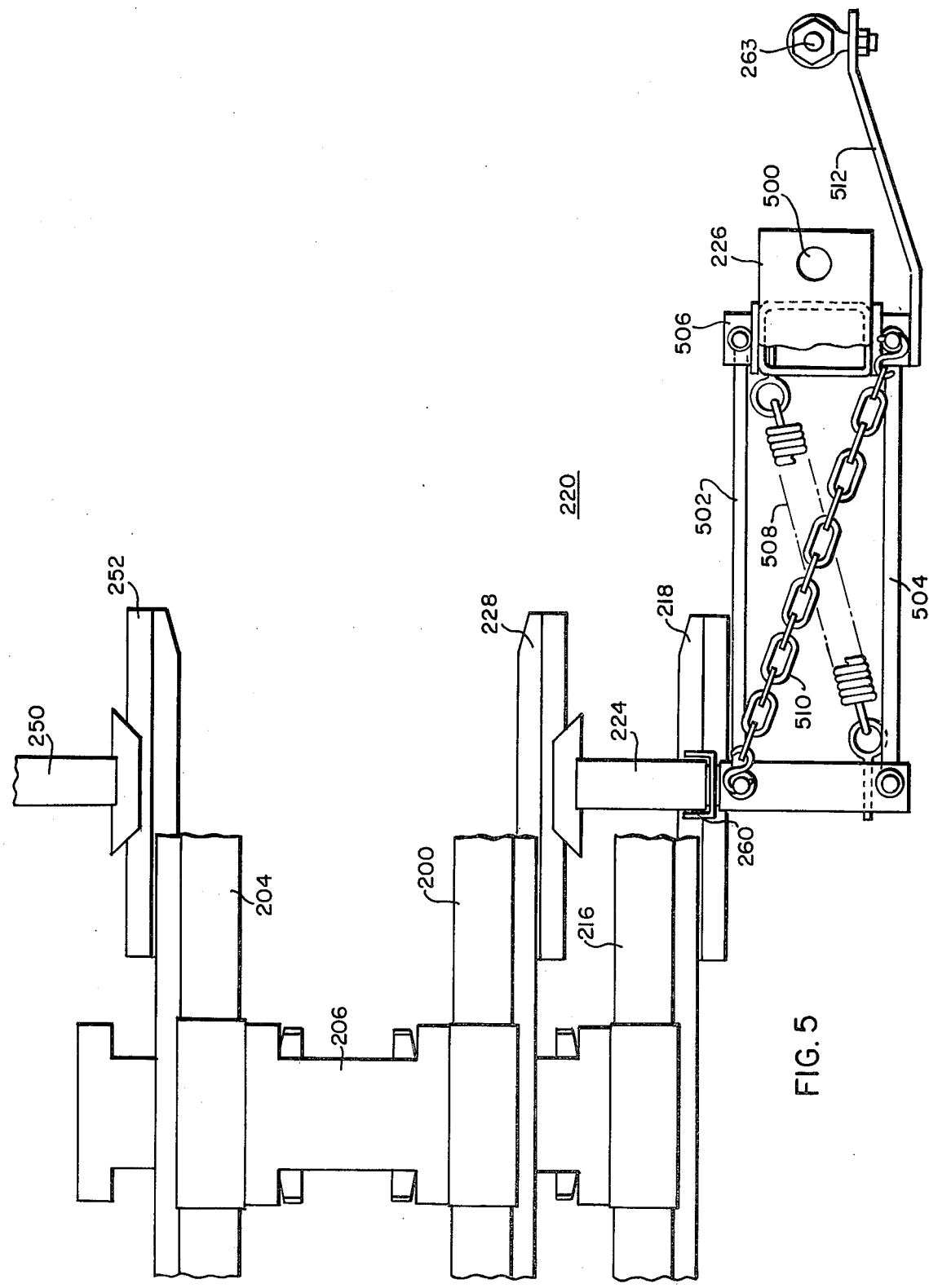
FIG. 5 is a top view of the present collector support apparatus.

FIG. 5 shows a top view of the collector support apparatus 220 shown in FIG. 2. The collector support member 226 is bolted to the vehicle frame through the hole 500. The collector shoe 228 operative with the power rail 200 is carried by the collector arm 224, which is connected through first member 502 and second member 504 as a parallelogram arrangement to the pivot support 506 operative with collector support member 226. A spring member 508 provides a desired contact pressure for the collector shoe 228 against the power rail 200, and a retainer chain 510 limits the movement of the collector shoe 228 in a clockwise direction about the collector support member 226 when the power rail 200 is not operative with the collector shoe 228. A connection arm 512 is provided between the pivot support 506 and the connection member 263 operative to control the rail alignment movement of the group fastener member 260.

Figure 6:
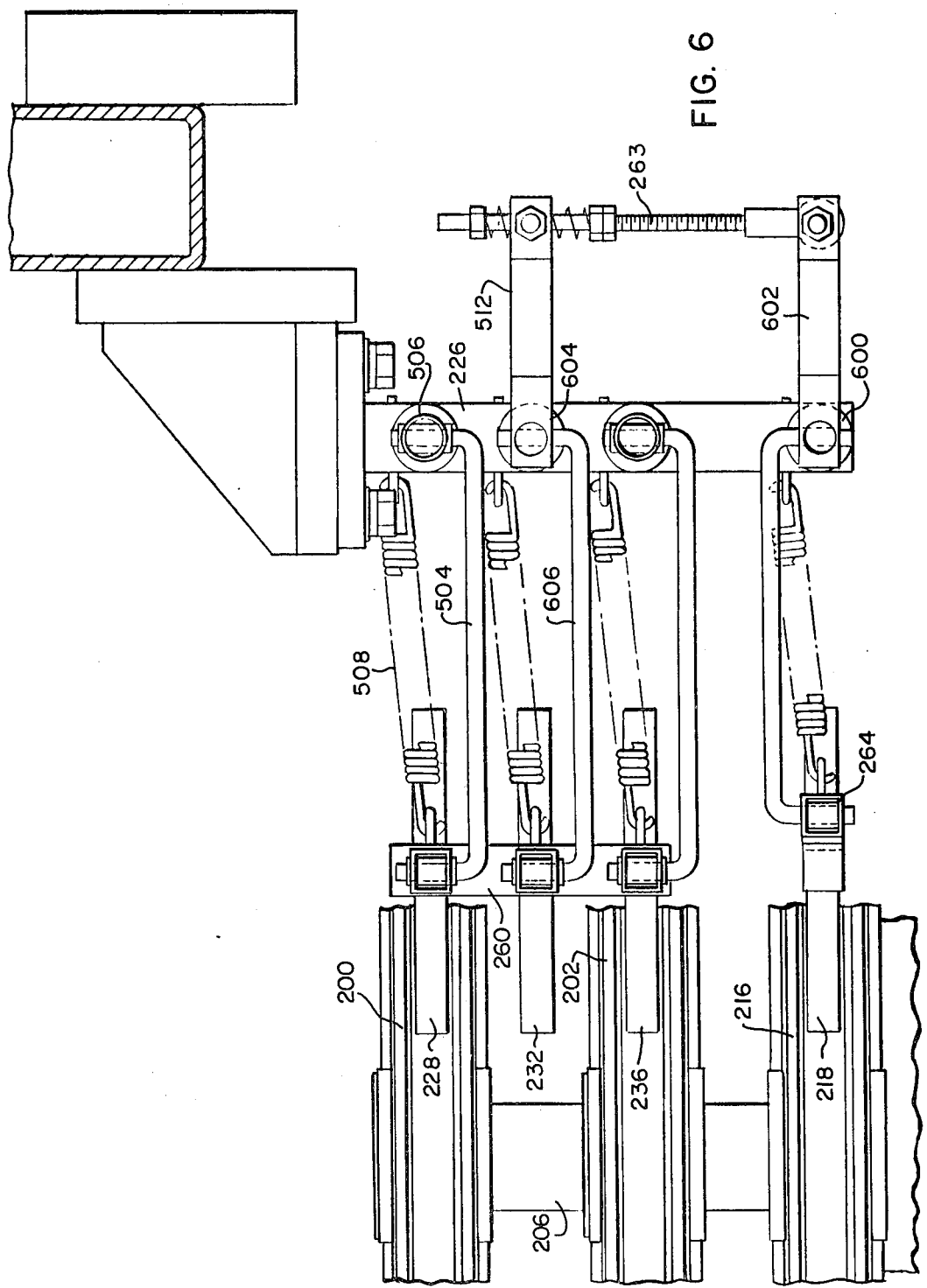
FIG. 6 is a side view of the present collector support apparatus.

FIG. 6 shows a side view of the collector support apparatus 220, including the collector support member 226, and the collector shoes 228, 236 and 218 operative with the respective power rails 200 and 202 and the ground rail 216. The collector shoe 218 following the position of ground rail 216 and collector arm 264 are operative through pivot support 600 and extended connection arm 602 to determine the movement of connection member 263 in a direction parallel to the axis of collector support member 226, for controlling the power rail alignment positions of the collector shoes 228 and 236 through the extended connection arm 512, pivot support 604, the member 606 and the fastener member 260.

The present disclosure covers the provision for positionally guiding in relation to the guide beam 28 and the power rails the vehicle carried power collector shoes through rail gaps, switches and crossovers at the desired vehicle maximum operating speed, such as 60 miles per hour. The signal rail 212 and ground rail 216 are used for position control of the respective vehicle carried power collector shoes by linking the associated collector arms to the continuously guided collector arms for the signal rail and ground rail collector shoes. There is disclosed a three phase, five rail power collection apparatus for fixed guideway type electrically propelled vehicles that permits high speed operation through rail gaps, switches and crossovers. Each vehicle carried collector support apparatus 220 and 240 includes power collector shoes guided through necessary interruptions in the three phase power rails by using the signal rail 212 and ground rail 216 as position piloting rails for the respective groups of power collector shoes which are equidistantly located, one to each side of the guide beam top flange 30 located below the roadway surface so that the vehicle can pass over the signal rail 212 and ground rail 216 when in the region of a switch. The signal rail 212 and ground rail 216 are continuous throughout the system, including switches, and since they are fixed in position by the rail support member 206 both vertically and laterally with respect to the three phase power rails 200, 202 and 204, they provide optimum position control of the vehicle carried power collector 228, 236 and 252 during the time when the vehicle carried power collector shoes are not in contact with the respective power rails 200, 202 and 204. Accurate vertical and lateral positioning of the vehicle carried power collector shoes in the power rail gap interval through switches is essential for high speed operation of a vehicle through switches and is accomplished in the controlled space envelope by linking the power collector shoes to the continuously guided signal rail collector shoe and ground rail collector shoe thereby assuring proper reentry position of the power collector shoes onto the power rails. The disclosed geometric configuration of the three power rails in combination with duplicate sets of vehicle carried collector support apparatus and associated collector shoes permits a vehicle to operate through crossovers and switches. Half of the power collector shoes which are required for the crossover capability are inactive at any given time, however, they remain guided even when not in contact with the power rails. It should be noted that the signal rail and ground rail can function interchangeably from an electrical standpoint.

Figure 7:
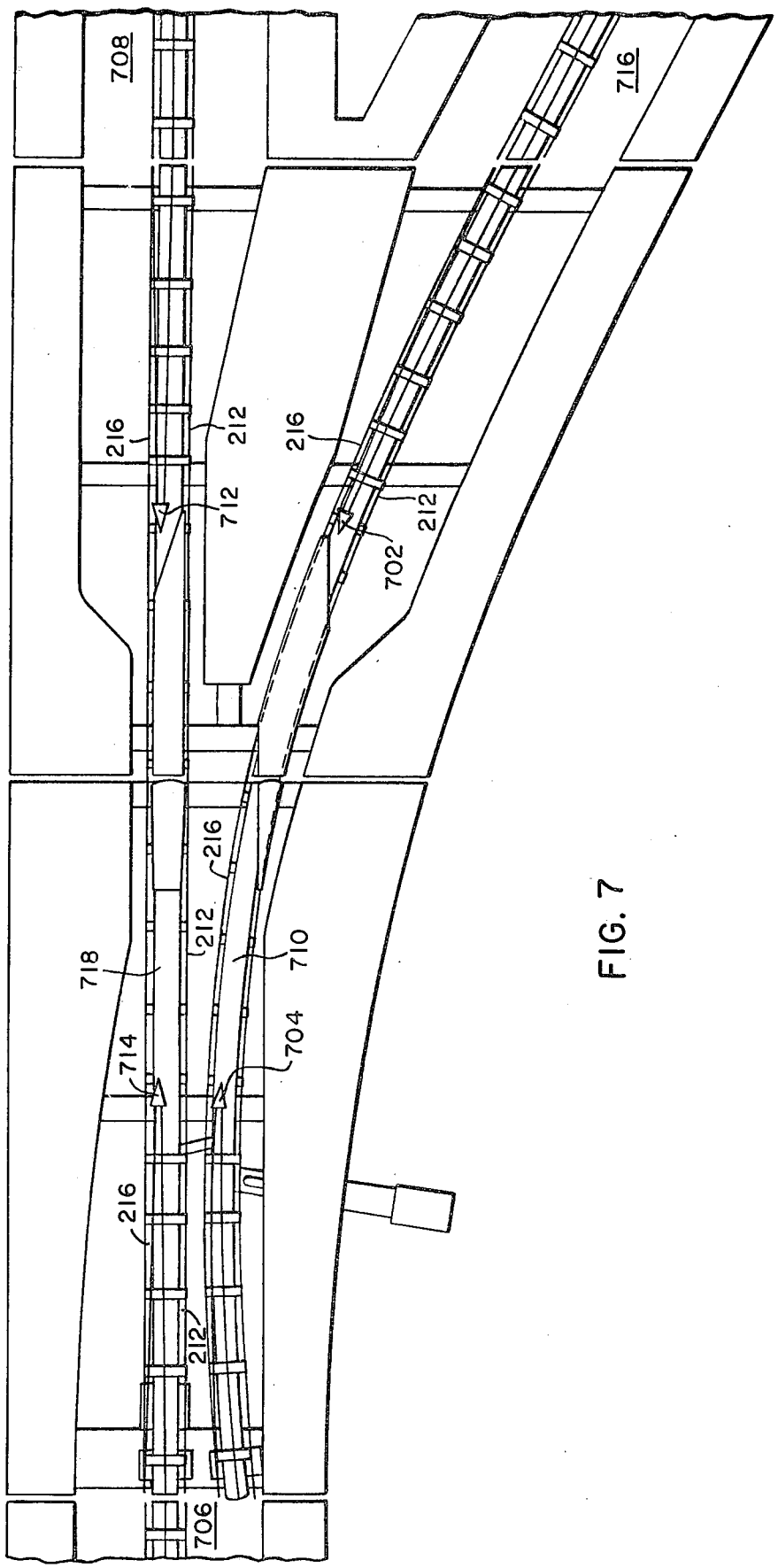
FIG. 7 is a top projection of a power and signal rail arrangement in combination with the first, second and third vehicle roadways, and the pivotal guide beam switch.

The power rail arrangement for use in combination with pivotal guide beam switch 700 which is shown in FIG. 7 provides a power rail gap between insulative wedges 702 and 704 to permit the vehicle wheels 40 of a vehicle traveling between roadways 706 and 708 to cross switching guide beam 710. Similarly, a power rail gap is provided between insulative wedges 712 and 714 to permit the wheels 38 of a vehicle traveling between roadways 706 and 716 to cross switching guide beam 718. These gaps are necessary because the power rails project above the guide beam switching sections. Since ground rail 216 and signal rail 212 do not project above the upper horizontal flange of the guide beam, rails 216 and 212 require no gap between insulative wedges 712 and 714 or between 702 and 704 to accommodate the wheels of the vehicle. However, ground rail 216 and signal rail 212 do require a small gap at the pivot ends of pivotal guide beam sections 718 and 710 to allow those guide beam sections to pivot on the bearing assemblies.

We claim:

1. In power collection apparatus for a vehicle having an electrical propulsion motor and being operative with a track having a vehicle support surface, with said track including one rail positioned below the vehicle support surface and being continuous through a predetermined area of the track and including a power rail positioned above the vehicle support surface and not being continuous through said predetermined area of the track, the combination of first collector means operative with said one rail and positioned below the vehicle support surface such that said one rail determines the position of the first collector means when the vehicle travels through said area, second collector means operative with said power rail and positioned above the vehicle support surface such that the power rail does not determine the position of the second collector means when the vehicle travels through said area, collector support means carried by said vehicle for pivotally supporting each of said first and second collector means, and connection means provided between said first collector means and said second collector means for controlling the position of said second collector means when the vehicle travels through said area and as determined by the position of said first collector means.

2. The power collector apparatus of claim 1, with said one rail being a conductive ground rail and operative with said power rail to energize the motor when the vehicle moves along the track.

3. The power collection apparatus of claim 1, with said track having a vehicle guide beam, and including a rail support member fastened to said guide means for supporting said one rail below the vehicle support surface of said track and for supporting said power rail above the vehicle support surface of said track.

4. The power collection apparatus of claim 1, with the second collector means being substantially parallel to the first collector means.

5. The power collection apparatus of claim 1, with said collector support means pivotally supporting said first collector means below the vehicle support surface such that the first collector means remains operative with the one rail when the vehicle travels on said vehicle support surface and through said area.

6. The power collection apparatus of claim 1, with said track having at least one additional power rail that is positioned above the vehicle support surface and not continuous through said predetermined area of the track and including third collector means operative with said one additional power rail, said collector support means pivotally supporting said third collector means, and with said connection means controlling the position of the third collector means when the vehicle travels through said area and as determined by the position of the first collector means.

7. The power collection apparatus of claim 1, with said connection means being operative to control the position of said second collector means in a vertical direction in relation to said track as determined by the position of said first collector means.

8. A power collection apparatus for a vehicle having an electrical propulsion motor and operative with a roadway track having a vehicle support surface and a switch area, with said roadway track including one rail substantially continuous through said switch area and a power rail not continuous through said switch area, the combination of first collector means operative with the one rail and having a first location in one of above and below the vehicle support surface such that said one rail determines the position of the first collector means when the vehicle travels through said switch area, second collector means operative with the power rail and having a second location in the other of above and below the vehicle support surface such that the power rail does not determine the position of the second collector means when the vehicle travels through said switch area, collector support means carried by said vehicle for pivotally supporting each of the first and second collector means, and connection means provided between the first collector means and the second collector means for controlling the position of the second collector means when the vehicle travels through said switch area and as determined by the position of the first collector means.

9. The power collection apparatus of claim 8, with said first location of the first collector means being below the vehicle support surface and with said second location of the second collector means being above the vehicle support surface.

10. The power collection apparatus of claim 8, with said one rail being located below the vehicle support surface and with said power rail being located above the vehicle support surface, with said first location being below the vehicle support surface such that said one rail determines the position of the first collector means below the vehicle support surface when the vehicle travels through said switch area, and with said second location being above the vehicle support surface such that the power rail does not determine the position of the second collector means above the vehicle support surface when the vehicle travels through said switch area.

* * * * *